(12) United States Patent
Smith et al.

(10) Patent No.: US 6,347,359 B1
(45) Date of Patent: Feb. 12, 2002

(54) METHOD FOR RECONFIGURATION OF RAID DATA STORAGE SYSTEMS

(75) Inventors: Gerald Edward Smith, Boynton Beach; Adam Wayne Weiner, Coral Springs, both of FL (US)

(73) Assignee: Aiwa Raid Technology, Inc., Boca Raton, FL (US)

( * ) Notice: Subject to any disclaimer, the term of this patent is extended or adjusted under 35 U.S.C. 154(b) by 0 days.

(21) Appl. No.: 09/253,106

(22) Filed: Feb. 19, 1999

Related U.S. Application Data
(60) Provisional application No. 60/076,125, filed on Feb. 27, 1998.

(51) Int. Cl.[7] .............................................. G06F 12/00
(52) U.S. Cl. ..................... 711/114; 711/111; 711/112; 711/165; 714/6; 714/7
(58) Field of Search ..................... 711/111, 112, 114, 711/165; 714/6, 7

(56) References Cited

U.S. PATENT DOCUMENTS

| | | | | |
|---|---|---|---|---|
| 5,574,851 A | * | 11/1996 | Rathunde | 395/182.05 |
| 6,058,455 A | * | 5/2000 | Islam et al. | 711/114 |
| 6,058,489 A | * | 5/2000 | Schultz et al. | 714/7 |
| 6,098,119 A | * | 8/2000 | Surugucchi et al. | 710/10 |

\* cited by examiner

*Primary Examiner*—Matthew Kim
*Assistant Examiner*—Pierre M. Vital
(74) *Attorney, Agent, or Firm*—Squire, Sanders, & Dempsey LLP.; David B. Abel; Dave B Koo

(57) ABSTRACT

A method for reconfiguration of a disk drive array is provided. For the method of the present invention, an array controller in a disk drive array examines the original configuration of the disk drive array (the source configuration) and the desired configuration (the destination configuration). Based on this examination, the array controller determines if the reconfiguration process may be optimized. To optimize the reconfiguration process, the array controller determines if a combination of changes to system parameters and possible rebuilding operations can replace the migration process. If this is possible, the reconfiguration process is modified to eliminate data migration. Otherwise, data migration is performed. In this way, the present invention provides a method that dramatically increases the speed of reconfiguration for some source and destination configurations.

18 Claims, 6 Drawing Sheets

METHOD FOR RECONFIGURATION OF RAID DATA STORAGE SYSTEMS

RELATED APPLICATION

The following application claims the benefit of U.S. Provisional Application Ser. No. 60/076,125 entitled "Method For Reconfiguration Of RAID Data Storage Systems" by Gerald E. Smith and Adam W. Weiner, filed Feb. 27, 1998, the disclosure of which is incorporated in this document by reference.

FIELD OF THE INVENTION

The present invention relates generally to mass data storage systems. More specifically, the present invention includes a method for reconfiguration of disk arrays.

BACKGROUND OF THE INVENTION

Disk arrays are data storage system that combine two or more independent disks into a single logical storage device. Compared to traditional devices, disk arrays offer increased performance, capacity and, in some cases, fault tolerance. To understand modern disk arrays, it is helpful to understand the RAID concept. RAID is an acronym originally described in a paper written by Patterson, Gibson, and Katz, entitled "A Case for Redundant Arrays of Inexpensive Disks, or RAID," published by the University of California, Berkeley in 1987. In this paper, the authors describe a taxonomy of disk array types, known as RAID levels one through five. Subsequently, the RAID taxonomy has been extended to include RAID level zero, as well as several other RAID levels.

For RAID level zero, data is split into blocks known as "strips" and spread in "stripes" over the system's disks. For example, in a four disk RAID level zero system having a one-kilobyte strip size, each four kilobytes stripe of data would be written as four one-kilobyte strips, one on each of the four disks. Three kilobytes of data would be written as three one-kilobyte strips, divided between three of the four drives. RAID level zero offers increased performance and capacity, but fails to provide any degree of fault tolerance.

In RAID level one systems, each disk is paired with a second disk. The operation of the disk pairs is coordinated so that each drive is a mirror image of its pair. If either disk fails, the remaining disk ensures that data is not lost. In this way, RAID level one offers a degree of fault tolerance not found in independent disks.

Like RAID level zero systems, RAID level three systems stripe data across two or more disks. RAID level three systems also include a separate parity disk. Each bit stored on the parity disk is the parity of the bits, stored in the same location, on the remaining data drives. Thus, the $n^{th}$ bit stored on the parity drive is the parity bit of the $n^{th}$ bits stored on each remaining drive. Typically, the parity bits are formed by performing an exclusive-or operation. Thus, the $n^{th}$ bit stored on the parity disk is formed as the exclusive-or of the $n^{th}$ bits stored on the remaining disks. The use of a parity drive gives RAID level three systems a degree of fault tolerance. In these systems, if any single drive fails (including the parity drive) the remaining drives may be used to reconstruct or interpolate the data stored on the failed drive.

RAID level five systems stripe data using the strip-by-strip basis of RAID level zero. RAID level five systems also store parity bits to increase fault tolerance. Unlike the RAID level three, however, RAID level five systems do not include a separate parity disk. Instead, for RAID level five, parity bits are stored in a rotating fashion across all of the disks included in the system. For example, in a three disk RAID level five system, the parity bits for the first strip of data might be stored on the first drive. The parity bits for the next strip of data would then be stored on the second drive. The parity bits for the third strip of data would then be stored on the third drive, and so on. RAID level five systems offer the same degree of fault tolerance provided by RAID level three systems. In use, however, RAID level five systems often provide higher performance.

RAID level ten systems are a combination of techniques borrowed from RAID level zero and RAID level one systems. These systems strip data across a series of disks in the same way as RAID level zero systems. These disks are known as the primary disks. In addition, RAID 10 systems include a mirroring disk for each primary disk. RAID level ten systems provide the high speed access of RAID level zero systems and the fault-tolerance of RAID level one systems.

Reconfiguration is a common occurrence in the operation of RAID systems. For example, RAID systems may be reconfigured to increase or decrease storage capacity by adding or subtracting disks. Alternately, RAID systems can be reconfigured to change fault tolerance, performance and storage capacity by changing RAID levels. RAID systems can also be reconfigured to tune performance by changing other parameters, such as the strip size used to perform striping.

Reconfiguring a RAID system generally requires that data be moved from the old system to the new system. In many cases, this data movement is performed by making a backup copy of the data using a tape drive or other backup device. The RAID system is then reconfigured by adding or subtracting drives or by changing other parameters. The data is then restored using the tape drive or other backup device.

The backup and restore method for moving data has several disadvantages. Chief among these disadvantages is the fact that the involved RAID system is unavailable for use until the operation has completed. In many cases, it may be impractical or impossible to idle the involved RAID system for the required time period. The backup and restore operation also requires that a human operator perform a number of manual steps. Each of these steps is error prone and increases the probability that important data may be destroyed.

Data migration is an alternative to the backup and restore method of data movement. Fundamentally, data migration involves copying each data bit from its pre-reconfiguration location to its post-reconfiguration location. During data migration, access to the RAID system may be maintained. In this way, a serious limitation of the backup and restore method of data movement is avoided. Unfortunately, data migration requires a great number of individual disk operations and is, therefore, often quite time consuming. During this time, access to the RAID system may be slowed dramatically. Thus, even data migration may be inconvenient or impractical. As a result, there is a need for systems that expedite the reconfiguration of RAID systems.

SUMMARY OF THE INVENTION

An embodiment of the present invention includes a method for reconfiguration of disk arrays. An exemplary environment for the present invention includes a reconfigurable RAID system. The RAID system includes a disk array composed of one or more data disks, zero or more mirror disks, and zero or more parity disks. The disk array operates under the control of an array controller. The array controller functions as an interface between the RAID system and any host computer to which the RAID system is connected. The array controller includes a processor and a memory system. The memory system includes an area of non-volatile ram (NVRAM) that remains valid during intentional and unintentional system shutdowns.

Data storage in the RAID system is characterized by a set of reconfigurable parameters including the number of data and parity disks included in the disk array, RAID level, strip size and stripe size. The method of the present invention allows the RAID system to move from a source configuration to a destination configuration. The move from the source configuration to the destination configuration may include changes in RAID level, number of data and parity disks included in the disk array or changes in parameters such as strip size and stripe size. Reconfiguration can also be performed to move data from one or more disks to one or more replacement disks. Preferably, the reconfiguration method is implemented as a program stored in the memory system of the array controller and executed by the array controller processor.

For the method of the present invention, the array controller examines the original configuration of the disk drive array (the source configuration) and the desired configuration (the destination configuration). Based on this examination, the array controller determines if the reconfiguration process may be optimized. To optimize the reconfiguration process, the array controller determines if a combination of changes to the parameters stored in the reserved area and possible rebuilding operations can replace the migration process. For example, reconfiguration of a RAID zero, three disk system to a RAID three, four disk system involves adding a single disk to act as a parity drive. This can be accomplished by updating the parameters stored in the reserved area to reflect the new configuration and performing a rebuild operation to initialize the added disk as a parity drive. If this is possible, the reconfiguration process is modified to eliminate data migration. In this way, the present invention provides a method that dramatically increases the speed of reconfiguration for some source and destination configurations.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
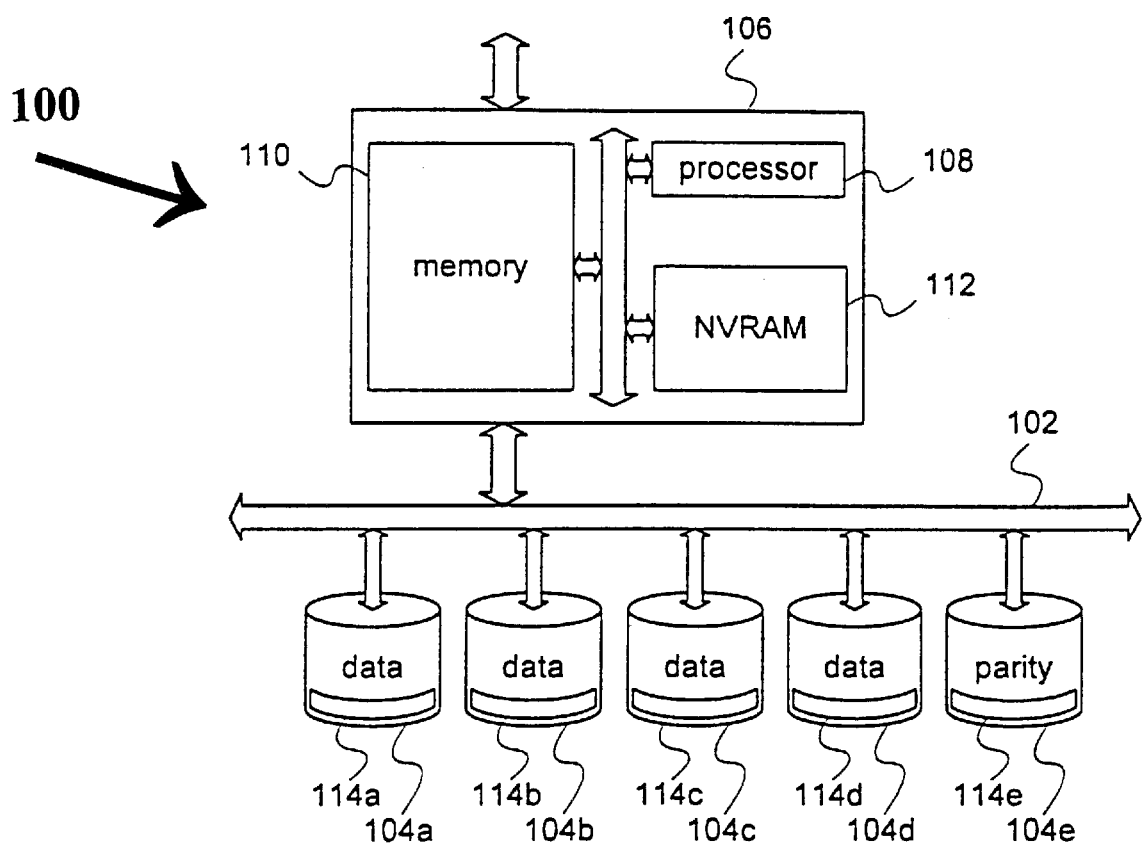
FIG. 1 is a block diagram of a RAID system shown as a representative environment for an embodiment of the present invention.

As shown in FIG. 1, a representative environment for the present invention includes a reconfigurable RAID system 100. RAID system 100 includes a disk array 102 composed of one or more disks of which disks 104a through 104e are representative. In the representative environment of FIG. 1, disks 104a through 104d are shown as data disks and 104e is shown as a parity disk. Disks 104 may also be configured as mirror disks. In practice, the mixture of data, mirror and parity disks will vary between different implementations of RAID system 100 and depends on the particular RAID configuration of RAID system 100. Disks 104 are representative of a wide range of commercially available or proprietary types including SCSI, IDE and other disk drive types.

Disk array 102 operates under the control of an array controller 106. Array controller 106 functions as an interface between RAID system 100 and any host system to which RAID system 100 is connected. Array controller 106 includes a processor 108, a memory 110 and a non-volatile ram (NVRAM) 112. Processor 108 executes programs included in memory 110 to control operation of disk array 102. Processor 102 uses NVRAM 112 as a durable data storage area. Data stored by processor 102 in NVRAM 112 remains valid during intentional and unintentional shutdowns of RAID system 100.

Array controller 106 maintains one or more reserved storage areas 114 within RAID system 100. In the case of FIG. 1, a reserved storage area 114 is included on each disk 104 (shown as reserved storage area 114a for disk 104a, reserved storage area 114b for disk 104b and so on). In some cases, it may be practical to include more, or fewer, reserved storage areas 114 within RAID system 100. Reserved areas 114 function as a durable data storage area. Thus, data stored by processor 102 in reserved storage areas 114 remains valid during intentional and unintentional shutdowns of RAID system 100.

RAID system 100 is reconfigurable. Specifically, RAID system 100 may be reconfigured to change the number and type of disks 104 included in disk array 102. The mixture of parity disks and data disks may also be changed. Other parameters, such as RAID level, strip size and stripe size may also be changed. RAID system 100 maintains parameters describing the number and type of disks 104, RAID level, strip size and stripe size in reserved areas 114. In general, it may be appreciated that reconfiguration involves an initial phase where RAID system 100 is physically or logically reconfigured (i.e., by adding or subtracting disks 104 or by changing parameters stored in reserved storage areas 114). This initial phase is followed by a secondary phase where the data included in RAID system 100 is migrated to reflect the reconfiguration.

Reconfiguration

A preferred embodiment of the present invention includes a method that allows RAID system 100 to move from a source configuration to a destination configuration. The move from the source configuration to the destination configuration may include changes in RAID level, number and type of disks 104 included in disk array 102, mixture of parity disks and data disks and changes in parameters such as strip size and stripe size. Preferably, the method is implemented as a program stored in memory 110 of array controller 106 and executed by processor 108 of array controller 106.

Figure 2:
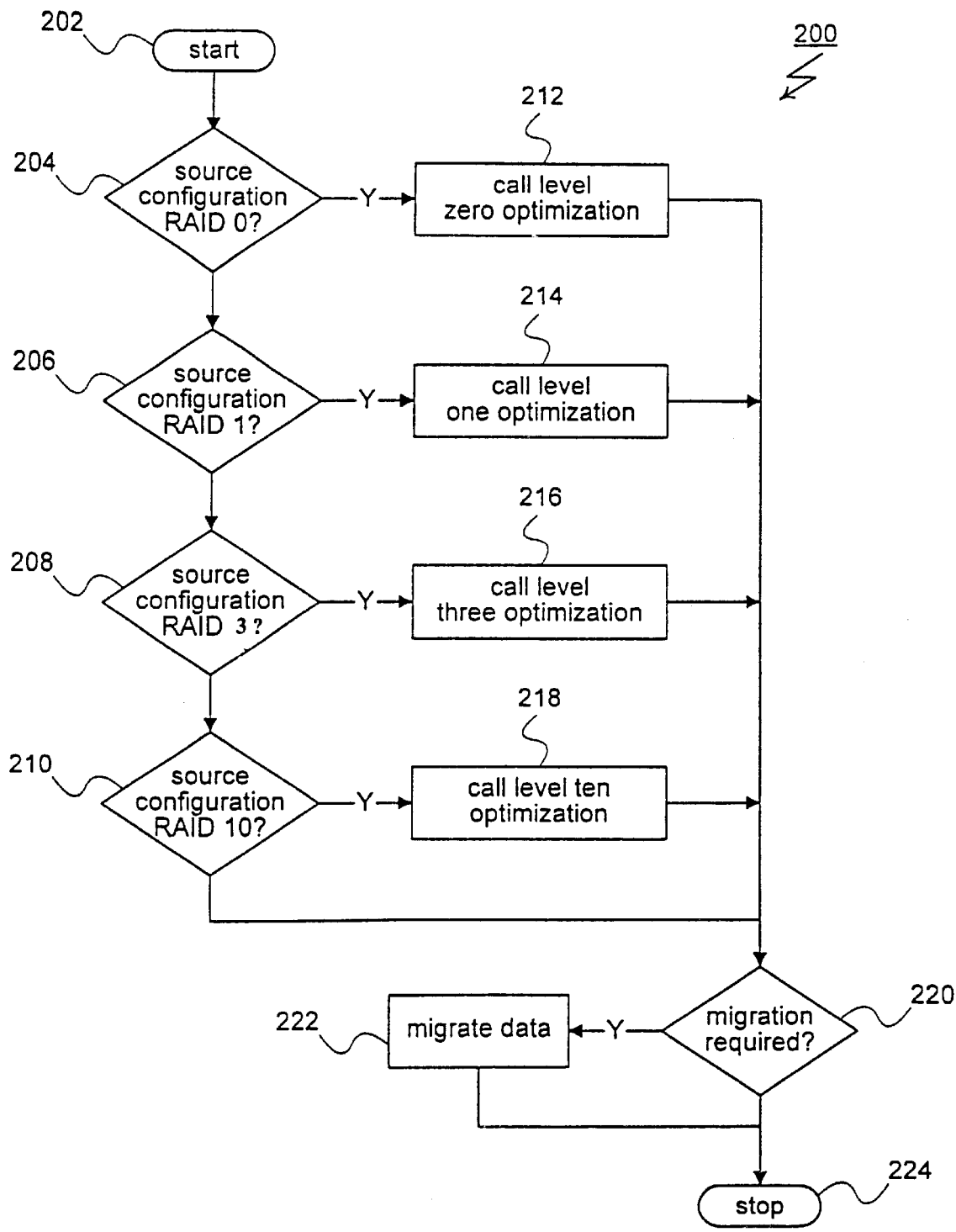
FIG. 2 is flowchart showing the steps included in an embodiment of the reconfiguration method of the present invention.

In FIG. 2, an embodiment of the method of the present invention is shown and generally designated 200. Method 200 begins symbolically with start marker 202. Start marker 202 is followed by a series of steps 204 through 210. In each of steps 204 through 210, array controller 106 tests to see if the source configuration is a RAID level zero configuration, RAID level one configuration, RAID level three configuration, or RAID level ten configuration, respectively. If any of these tests are positive, array controller 106 calls a corresponding optimization routine. Thus, if step 204 determines that the source configuration is a RAID level zero configuration array controller 106 calls a level zero optimization routine in step 212. Similarly, if step 206 determines that the source configuration is a RAID level one configuration array controller 106 calls a level one optimization routine in step 214. Each of these optimization routines will be described in following portions of this document.

The net result of this series of steps is that, for RAID levels zero, one, three and ten, appropriate optimization routines are called. After these tests, and invocation of optimization routines, execution of method 200 continues at step 220. In step 220, array controller 106 determines if reconfiguration from the source configuration to the destination configuration will require data migration. Array controller 106, performs this test because the optimization routines may have made data migration unnecessary. To make this determination, each optimization routine is configured to set or return a status variable indicating whether data migration is required. Array controller 106 tests the state of the status variable to determine if data migration is required.

In the positive case (i.e., where data migration is required) execution of method 200 continues at step 222. In step 222 array controller 106 invokes a data migration routine to perform the data migration required to reconfigure the source configuration to the destination configuration. Execution of method 200 then completes, symbolically with stop placeholder 224. Stop placeholder 224 is also reached in cases where array controller 106 determined that data migration is not required. In general, it should be appreciated that the particular ordering of steps within method 200 is intended to be representative. The present invention is specifically intended to include cases where the individual order of steps differs from the described embodiment.

Figure 3:
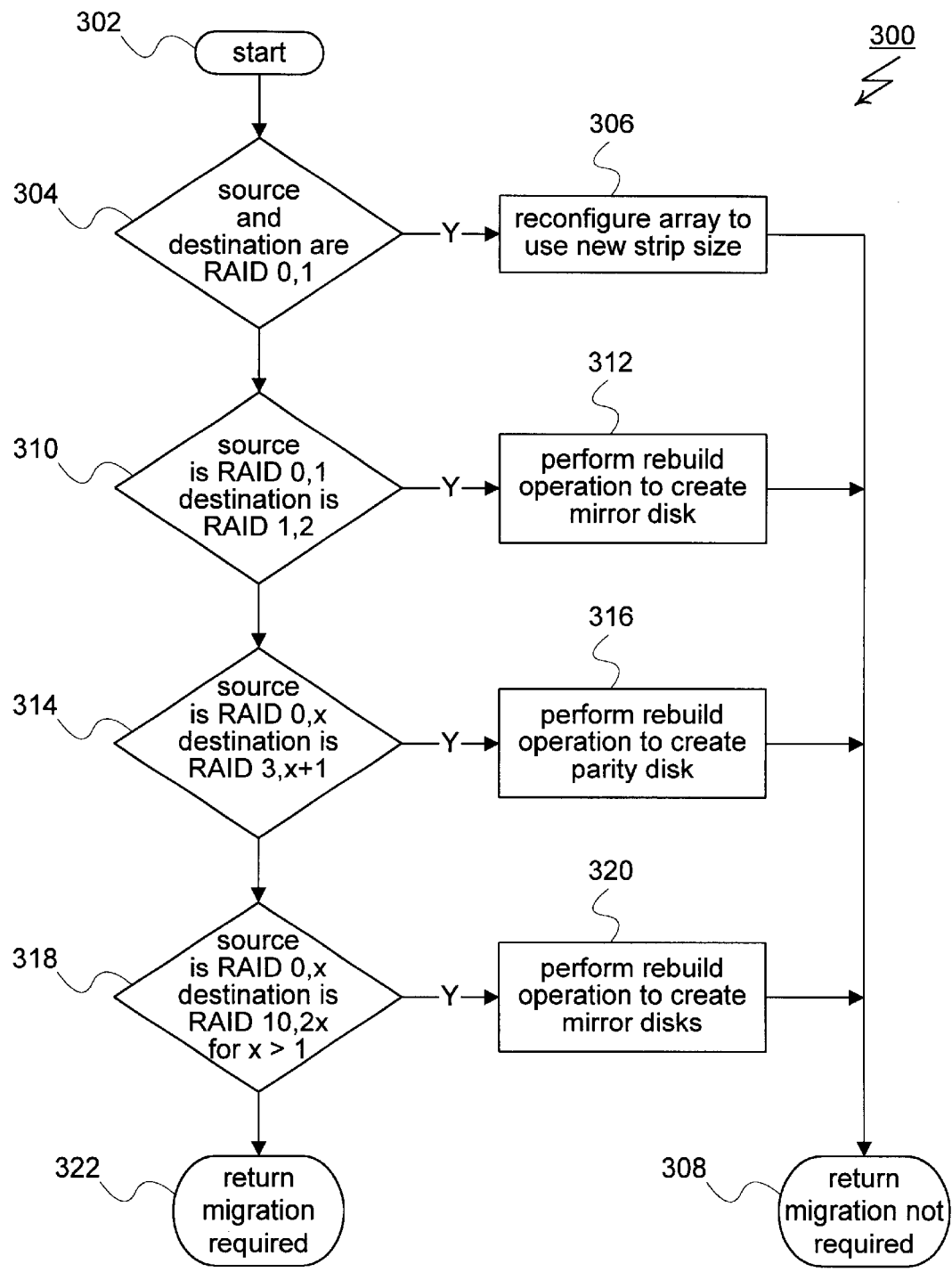
FIG. 3 is flowchart showing the steps included in an embodiment of the level zero optimization method of the present invention.

In FIG. 3, a method for the level zero optimization routine is shown and generally designated 300. Method 300 begins symbolically with step 302. In step 304, array controller 106 determines if the source and destination configurations are both RAID level zero, one disk configurations. Array controller 106 also determines if the single disk 104 included in the source configuration is included in the destination configuration. If both of these tests are positive, execution of method 300 continues at step 306. In step 306, array controller 106 has determined that the reconfiguration is limited to a change in strip size (since the RAID level and disk count are unchanged). Since there is only one disk involved, this reconfiguration may be performed by changing parameters stored in reserved storage areas 114 without the need for data migration. In step 306, array controller 106 configures the parameters stored in reserved storage areas 114 to reflect the new strip size. Execution of method 300 then continues at step 308 where the level zero optimization routine returns with a value indicating that data migration is not required.

In the case where array controller 106 determines that determines that source and destination configurations are not both RAID level zero, one disk configurations, execution of method 300 continues at step 310. In step 310, array controller 106 determines if the source configuration is RAID level zero, one disk and the destination configuration is RAID level one, two disk. Array controller 106 also determines if the single disk 104 included in the source configuration is included in the destination configuration. If both of these tests are positive, execution of method 300 continues at step 312. In step 312, array controller 106 has determined that the reconfiguration is limited to adding a new disk to mirror the single disk included in the source configuration. Since there is only one disk involved, this reconfiguration may be performed by changing the parameters stored in reserved storage areas 114 without the need for data migration. In step 312, array controller 106 configures the parameters stored in reserved storage areas 114 to reflect new configuration as RAID level one, two disk. A rebuild routine is then called to copy the contents of the single disk of the source configuration to the second disk added by the destination configuration. Execution of method 300 then continues at step 308 where the level zero optimization routine returns with a value indicating that data migration is not required.

In step 314, array controller 106 determines if the source configuration is RAID level zero, with x disks, and the destination configuration is RAID level three with x+1 disks. Array controller 106 also determines if each disk 104 included in the source configuration is included in the destination configuration. In addition, as part of step 314, array controller 106 determines if the strip size of the source configuration is equal to the strip size of the destination configuration. If each of these tests is positive, execution of method 300 continues at step 316. In step 316, array controller 106 has determined that the reconfiguration is limited to adding a new disk to provide parity for the disk or disks included in the source configuration. In step 316, array controller 106 configures the parameters stored in reserved storage areas 114 to reflect the new RAID level three, x+1 disk configuration. A rebuild routine is then called to initialize the added disk with the parity information for the drives included in the source configuration. Execution of method 300 then continues at step 308 where the level zero optimization routine returns with a value indicating that data migration is not required.

In step 318, array controller 106 determines if the source configuration is RAID level zero, with x disks, and the destination configuration is RAID level ten with 2x disks. Array controller 106 also determines if each disk 104 included in the source configuration is included in the destination configuration. In addition, as part of step 318, array controller 106 determines if the strip size of the source configuration is equal to the strip size of the destination configuration. If each of these tests are positive, execution of method 300 continues at step 320. In step 320, array controller 106 has determined that the number of disks will double during the reconfiguration from the source configuration to the destination configuration. Each added disk is, however, a mirror copy of a disk included in the source configuration. In step 320, array controller 106 configures the parameters stored in reserved storage areas 114 to reflect the new RAID level ten, 2x disk configuration. A rebuild routine is then called to copy the contents of the disks of the source configuration to the disks added by the destination configuration. Execution of method 300 then continues at step 308 where the level zero optimization routine returns with a value indicating that data migration is not required.

In the case where method 300 is unable to perform an applicable optimization, execution continues at step 322. In step 322 the level zero optimization routine returns with a value indicating that data migration will be required.

Figure 4:
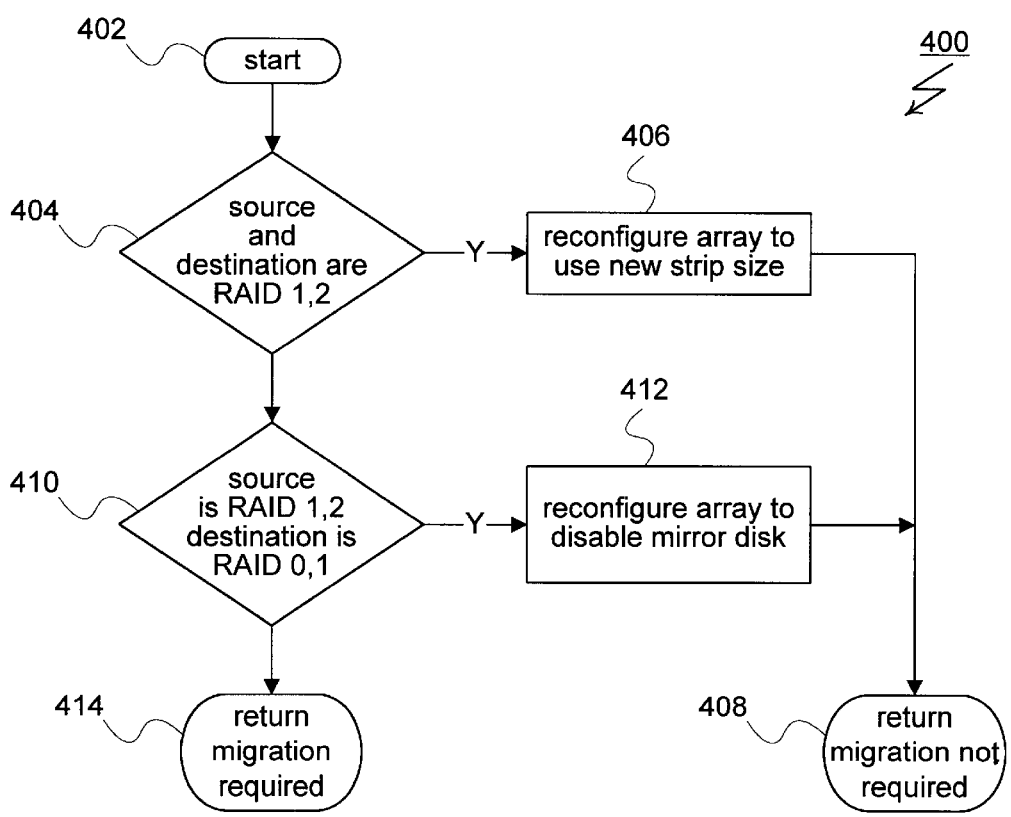
FIG. 4 is flowchart showing the steps included in an embodiment of the level one optimization method of the present invention.

In FIG. 4, a method for the level one optimization routine is shown and generally designated 400. Method 400 begins symbolically with step 402. In step 404, array controller 106 determines if the source and destination configurations are both RAID level one, two disk configurations. Array controller 106 also determines if each disk 104 included in the source configuration is included in the destination configuration. If both of these tests are positive, execution of method 400 continues at step 406. In step 406, array controller 106 has determined that the reconfiguration is limited to a change in strip size (since the RAID level and disk count are unchanged). Because of the RAID level involved (level one) and the number of disks involved (two) this reconfiguration can be performed without data migration. In step 406, array controller 106 configures the parameters stored in reserved storage areas 114 to reflect the new strip size. Execution of method 400 then continues at step 408 where the level one optimization routine returns with a value indicating that data migration is not required.

In the case where array controller 106 determines that source and destination configurations are not both RAID level one, two disk configurations, execution of method 400 continues at step 410. In step 410, array controller 106 determines if the source configuration is RAID level one, two disk and the destination configuration is RAID level zero, one disk. Array controller 106 also determines if one of the disks 104 included in the source configuration is included in the destination configuration. If both of these tests are positive, execution of method 400 continues at step 412. In step 412, array controller 106 has determined that the reconfiguration is limited to removing a mirroring disk. Array controller 106 may perform this reconfiguration by changing the parameters stored in reserved storage areas 114 without the need for data migration. In step 412, array controller 106 configures the parameters stored in reserved storage areas 114 to disable the mirroring disk being removed. Execution of method 400 then continues at step 408 where the level one optimization routine returns with a value indicating that data migration is not required.

In the case where method 400 is unable to perform an applicable optimization, execution continues at step 414. In step 414 the level one optimization routine returns with a value indicating that data migration will be required.

Figure 5:
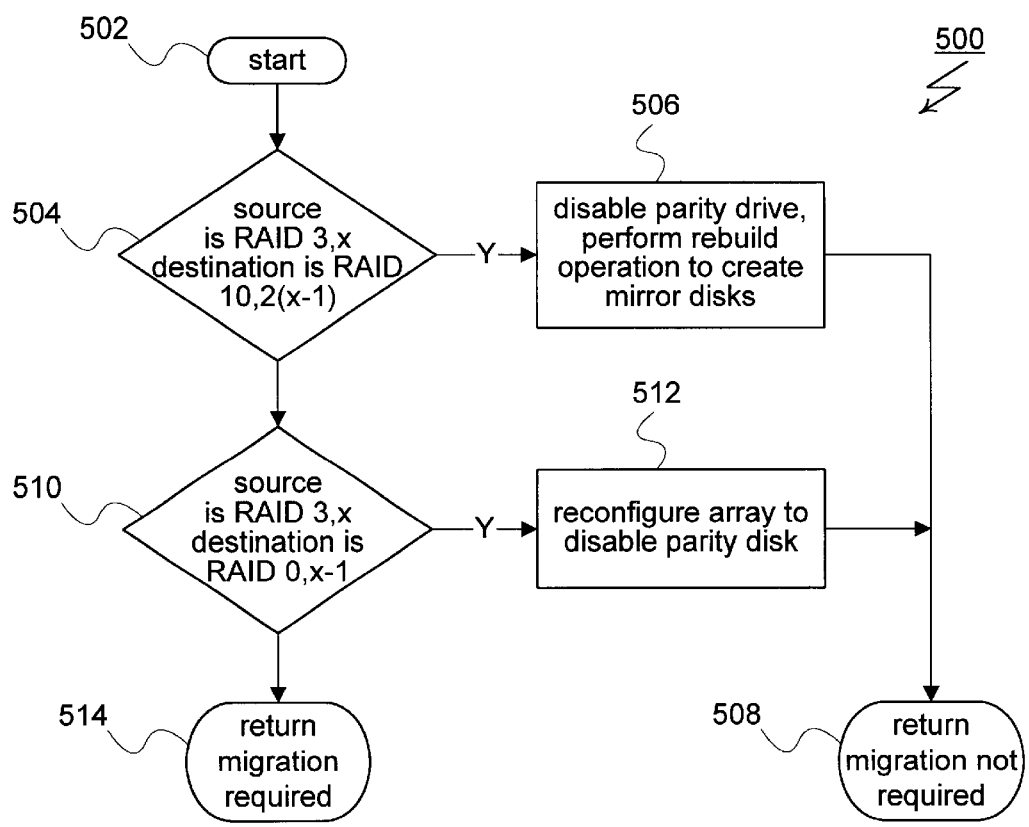
FIG. 5 is flowchart showing the steps included in an embodiment of the level three optimization method of the present invention.

In FIG. 5, a method for the level three optimization routine is shown and generally designated 500. Method 500 begins symbolically with step 502. In step 504, array controller 106 determines if the source configuration is RAID level three, with x disks and the destination configuration is RAID level ten with 2 (x−1) disks. Array controller 106 also determines if data disk 104 included in the source configuration is included in the destination configuration. In addition, as part of step 504, array controller 106 determines if the parity drive of the source configuration is disabled or otherwise off line. If each of these tests are positive, execution of method 500 continues at step 506. In step 506, array controller 106 has determined that the reconfiguration is limited to a removal of the parity drive required by RAID level three and the addition of mirroring drives as required by RAID level ten. Array controller 106 has also determined that the overall redundancy of RAID system 100 will not be decreased during reconfigured (because the parity drive being removed is already off line). Array controller 106 may perform this reconfiguration by changing the parameters stored in reserved storage areas 114 without the need for data migration. In step 506, array controller 106 configures the parameters stored in reserved storage areas 114 to disable the parity disk being removed and to enable the mirroring disk being added. A rebuild routine is then called to copy the remaining, non-parity disks of the source configuration to mirroring disks added by the destination configuration. Execution of method 500 then continues at step 508 where the level three optimization routine returns with a value indicating that data migration is not required.

In step 510, array controller 106 determines if the source configuration is RAID level three, with x disks and the destination configuration is RAID level zero with x−1 disks. Array controller 106 also determines if each data disk 104 included in the source configuration is included in the destination configuration. If both of these tests are positive, execution of method 500 continues at step 512. In step 512, array controller 106 has determined that the reconfiguration is limited to removing a parity disk. Array controller 106 may perform this reconfiguration by changing parameters in the parameters stored in reserved storage areas 114 without the need for data migration. In step 512, array controller 106 configures the parameters stored in reserved storage areas 114 to disable the parity disk being removed. Execution of method 500 then continues at step 508 where the level three optimization routine returns with a value indicating that data migration is not required.

In the case where method 500 is unable to perform an applicable optimization, execution continues at step 514. In step 514 the level three optimization routine returns with a value indicating that data migration will be required.

Figure 6:
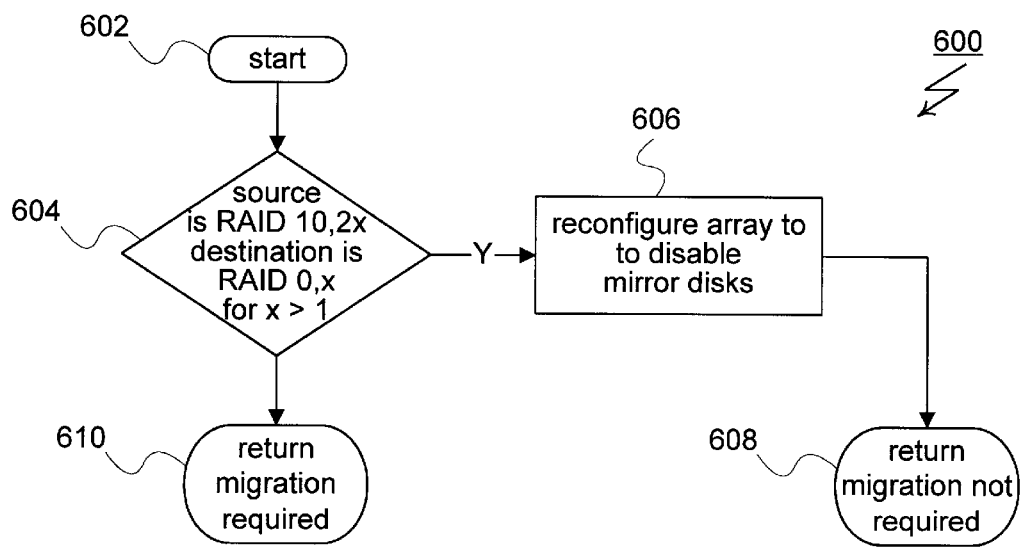
FIG. 6 is flowchart showing the steps included in an embodiment of the level ten optimization method of the present invention.

In FIG. 6, a method for the level ten optimization routine is shown and generally designated 600. Method 600 begins symbolically with step 602. In step 604, array controller 106 determines if the source configuration is RAID level ten, with 2x disks and the destination configuration is RAID level zero with x disks. Array controller 106 also determines if the destination configuration includes one disk 104 for each data disk 104/mirrored data disk 104 pair in the source configuration. If both of these tests are positive, execution of method 600 continues at step 606. In step 606, array controller 106 has determined that the reconfiguration is limited to removing the mirroring disks required by RAID level 10. Array controller 106 may perform this reconfiguration by changing parameters in the reserved storage areas 114 without the need for data migration. In step 606, array controller 106 configures the parameters stored in reserved storage areas 114 to disable the mirroring disks being removed. Execution of method 600 then continues at step 608 where the level ten optimization routine returns with a value indicating that data migration is not required.

In the case where method 600 is unable to perform an applicable optimization, execution continues at step 610. In step 610 the level ten optimization routine returns with a value indicating that data migration will be required.

It should be appreciated that the foregoing description of methods 200 through 600 is intended to be exemplary in nature. Thus, for the purposes of the present invention, these methods may be implemented in many different ways. For example, it may be preferably, in some cases, to include methods 300 through 600 as inline code within method 600. In other cases, it may be practical to provide a table lookup that chooses appropriate optimizations based on the source and destination configurations. In this way, the logic of the described methods may be replaced with table driven logic. In other cases, other methods and data structures may be more suitable. It should also be appreciated that other optimizations may be added to the described methods. These added methods may extend the capabilities of the described embodiment. This is particularly relevant if new RAID levels are developed in the future.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for reconfiguration of a disk array from a source configuration to a destination configuration, the method comprising the steps of:

providing a description of the disk array;

determining if reconfiguration can be accomplished without data migration by examining the source configuration and the destination configuration and determining if the source configuration is RAID level zero with one or more disks and if the destination configuration is RAID level zero, one, three or ten with at least the same number of disks as the source configuration;

migrating the data in the disk array from the source configuration to the destination configuration if migration is required; and updating the description of the disk array to reflect the destination configuration.

2. A method for reconfiguration of a disk array from a source configuration to a destination configuration, the method comprising the steps of:

providing a description of the disk array;

determining if reconfiguration can be accomplished without data migration by examining the source configuration and the destination configuration and determining if any of the following are true:

the source configuration and destination configurations are RAID level zero with one disk;

the source configuration is RAID level zero with one disk and the destination configuration is RAID level one with two disks;

the source configuration is RAID level zero and the destination configuration is RAID level three where the destination configuration has one more disk than the source configuration; or the source configuration is RAID level zero and the destination configuration is RAID level ten where the destination configuration has twice as many disks as the source configuration;

migrating the data in the disk array from the source configuration to the destination configuration if migration is required; and updating the description of the disk array to reflect the destination configuration.

3. A method for reconfiguration of a disk array from a source configuration to a destination configuration, the method comprising the steps of:

providing a description of the disk array;

determining if reconfiguration can be accomplished without data migration by examining the source configuration and the destination configuration and determining if any of the following are true:

the source configuration and destination configuration are RAID level one with two disks; or the source configuration is RAID level one with two disks and the destination configuration is RAID level zero with one disk;

migrating the data in the disk array from the source configuration to the destination configuration if migration is required; and updating the description of the disk array to reflect the destination configuration.

4. A method for reconfiguration of a disk array from a source configuration to a destination configuration, the method comprising the steps of:

providing a description of the disk array;

determining if reconfiguration can be accomplished without data migration by examining the source configuration and the destination configuration and determining if any of the following are true:

the source configuration is RAID level three with X disks and the destination configuration is RAID level ten with 2*(X−1) disks; or the source configuration is RAID level three with X disks and the destination configuration is RAID level zero with X−1 disks;

migrating the data in the disk array from the source configuration to the destination configuration if migration is required; and updating the description of the disk array to reflect the destination configuration.

5. A method for reconfiguration of a disk array from a source configuration to a destination configuration, the method comprising the steps of:

providing a description of the disk array;

determining if reconfiguration can be accomplished without data migration by examining the source configuration and the destination configuration and determining if the following is true:

the source configuration is RAID level ten with 2X disks and the destination configuration is RAID level zero with X disks;

migrating the data in the disk array from the source configuration to the destination configuration if migration is required; and updating the description of the disk array to reflect the destination configuration.

6. A method for reconfiguration of a disk array from a source configuration to a destination configuration, the method comprising the steps of:

providing a description of the disk array;

determining if reconfiguration can be accomplished without data migration by examining the source configuration and the destination configuration and determining if any of the following are true:

the reconfiguration is limited to the addition or removal of a mirroring disk;

the reconfiguration is limited to addition or removal of a parity disk;

the reconfiguration is limited to a change in strip size;

migrating the data in the disk array from the source configuration to the destination configuration if migration is required; and updating the description of the disk array to reflect the destination configuration.

7. A computer program product comprising a computer usable medium having computer readable code embodied therein, the computer readable program code devices configured to perform a method for reconfiguration of a disk array from a source configuration to a destination configuration, the method comprising the steps of:

provinding a description of the disk array;

determining if reconfiguration can be accomplished with or without data migration by examining the source configuration and the destination configuration and determining if the source configuration is RAID level zero with one or more disks and if the destination configuration is RAID level zero, one, three or ten with at least the same number of disks as the source configuration;

migrating the data in the disk array from the source configuration to the destination configuration if migration is required; and updating the description of the disk array to reflect the destination configuration.

8. A computer program product comprising a computer usable medium having computer readable code embodied therein, the computer readable program code devices configured to perform a method for reconfiguration of a disk array from a source configuration to a destination configuration, the method comprising the steps of:

providing a description of the disk array;

determining if reconfiguration can be accomplished with or without data migration by examining the source configuration and the destination configuration and determining if any of the following are true:

the source configuration and destination configuration are RAID level zero with one disk;

the source configuration is RAID level zero with one disk and the destination configuration is RAID level one with two disks;

the source configuration is RAID level zero and the destination configuration is RAID level three where the destination configuration has one more disk than the source configuration; or the source configuration is RAID level zero and the destination configuration is RAID level ten where the destination configuration has twice as many disks as the source configuration;

migrating the data in the disk array from the source configuration to the destination configuration if migration is required; and updating the description of the disk array to reflect the destination configuration.

9. A computer program product comprising a computer usable medium having computer readable code embodied therein, the computer readable program code devices configured to perform a method for reconfiguration of a disk array from a source configuration to a destination configuration, the method comprising the steps of:

providing a description of the disk array;

determining if reconfiguration can be accomplished with or without data migration by examining the source configuration and the destination configuration; and determining if any of the following are true;

the source configuration and destination configuration are RAID level one with two disks; or the source configuration is RAID level one with two disks and the destination configuration is RAID level zero with one disk;

migrating the data in the disk array from the source configuration to the destination configuration if migration is required; and updating the description of the disk array to reflect the destination configuration.

10. A computer program product comprising a computer usable medium having computer readable code embodied therein, the computer readable program code devices configured to perform a method for reconfiguration of a disk array from a source configuration to a destination configuration, the method comprising the steps of:

providing a description of the disk array;

determining if reconfiguration can be accomplished with or without data migration by examining the source configuration and the destination configuration and determining if any of the following are true:

the source configuration is RAID level three with X disks and the destination configuration is RAID level ten with $2*(X-1)$ disks; or the source configuration is RAID level three with X disks and the destination configuration is RAID level zero with $X-1$ disks;

migrating the data in the disk array from the source configuration to the destination configuration if migration is required; and updating the description of the disk array to reflect the destination configuration.

11. A computer program product comprising a computer usable medium having computer readable code embodied therein, the computer readable program code devices configured to perform a method for reconfiguration of a disk array from a source configuration to a destination configuration, the method comprising the steps of:

providing a description of the disk array;

determining if reconfiguration can be accomplished with or without data migration by examining the source configuration and the destination configuration and determining if the following is true:

the source configuration is RAID level ten with 2X disks and the destination configuration is RAID level zero with X disks;

migrating the data in the disk array from the source configuration to the destination configuration if migration is required; and updating the description of the disk array to reflect the destination configuration.

12. A computer program product comprising a computer usable medium having computer readable code embodied therein, the computer readable program code devices configured to perform a method for reconfiguration of a disk array from a source configuration to a destination configuration, the method comprising the steps of:

providing a description of the disk array;

determining if reconfiguration can be accomplished with or without data migration by examining the source configuration and the destination configuration and determining if any of the following are true:

the reconfiguration is limited to the addition or removal of a mirroring disk;

the reconfiguration is limited to addition or removal of a parity disk;

the reconfiguration is limited to a change in strip size;

migrating the data in the disk array from the source configuration to the destination configuration if migration is required; and updating the description of the disk array to reflect the destination configuration.

13. A system for configuration of a disk array from a source configuration to a destination configuration, the system comprising:

means configured to cause a processor to provide a description of the disk array;

means configured to cause a processor to determine if reconfiguration can be accomplished with or without data migration by examining the source configuration and the destination configuration and determining if the source configuration is RAID level zero with one or more disks and if the destination configuration is RAID level zero, one, three or ten with at least the same number of disks as the source configuration; and means configured to cause a processor to update the description of the disk array to reflect the destination configuration.

14. A system for configuration of a disk array from a source configuration to a destination configuration, the system comprising:

means configured to cause a processor to provide a description of the disk array;

means configured to cause a processor to examine the source configuration and the destination configuration;

means configured to cause a processor to determine if any of the following are true:

the source configuration and destination configuration are RAID level zero with one disk;

the source configuration is RAID level zero with one disk and the destination configuration is RAID level one with two disks;

the source configuration is RAID level zero and the destination configuration is RAID level three where the destination configuration has one more disk than the source configuration; or the source configuration is RAID level zero and the destination configuration is RAID level ten where the destination configuration has twice as many disks as the source configuration;

means configured to cause a processor to determine if reconfiguration can be accomplished with or without data migration; and means configured to cause a processor to update the description of the disk array to reflect the destination configuration.

15. A system for configuration of a disk array from a source configuration to a destination configuration, the system comprising:

means configured to cause a processor to provide a description of the disk array;

means configured to cause a processor to examine the source configuration and the destination configuration; and means configured to cause a processor to determine if any of the following are true:

the source configuration and destination configuration are RAID level one with two disks; or the source configuration is RAID level one with two disks and the destination configuration is RAID level zero with one disk;

means configured to cause a processor to determine if reconfiguration can be accomplished with or without data migration; and means configured to cause a processor to update the description of the disk array to reflect the destination configuration.

16. A system for configuration of a disk array from a source configuration to a destination configuration, the system comprising:

means configured to cause a processor to provide a description of the disk array;

means configured to cause a processor to examine the source configuration and the destination configuration; and means configured to cause a processor to determine if any of the following are true:

the source configuration is RAID level three with X disks and the destination configuration is RAID level ten with 2*(X−1) disks; or the source configuration is RAID level three with X disks and the destination configuration is RAID level zero with X−1 disks; means configured to cause a processor to determine if reconfiguration can be accomplished with or without data migration; and means configured to cause a processor to update the description of the disk array to reflect the destination configuration.

17. A system for configuration of a disk array from a source configuration to a destination configuration, the system comprising:

means configured to cause a processor to provide a description of the disk array;

means configured to cause a processor to examine the source configuration and the destination configuration; and means configured to cause a processor to determine if the following is true;

the source configuration is RAID level ten with 2X disks and the destination configuration is RAID level zero with X disks;

means configured to cause a processor to determine if reconfiguration can be accomplished with or without data migration; and means configured to cause a processor to update the description of the disk array to reflect the destination configuration.

18. A system for configuration of a disk array from a source configuration to a destination configuration, the system comprising:

means configured to cause a processor to provide a description of the disk array;

means configured to cause a processor to examine the source configuration and the destination configuration; and means configured to cause a processor to determine if any of the following are true:

the reconfiguration is limited to the addition or removal of a mirroring disk;

the reconfiguration is limited to addition or removal of a parity disk;

the reconfiguration is limited to a change in strip size;

means configured to cause a processor to determine if reconfiguration can be accomplished with or without data migration; and means configured to cause a processor to update the description of the disk array to reflect the destination configuration.

* * * * *